(12) United States Patent
Burton

(10) Patent No.: US 12,709,049 B2
(45) Date of Patent: Aug. 18, 2026

(54) METHODS FOR DETERMINING ZONE TYPES OF HEATING ZONES IN AN INJECTION MOLDING SYSTEM

(71) Applicant: Husky Injection Molding Systems Ltd., Bolton (CA)

(72) Inventor: Bjorn Burton, Georgia, VT (US)

(73) Assignee: Husky Injection Molding Systems Ltd., Bolton (CA)

(*) Notice: Subject to any disclaimer, the term of this patent is extended or adjusted under 35 U.S.C. 154(b) by 109 days.

(21) Appl. No.: 18/846,305

(22) PCT Filed: Apr. 6, 2023

(86) PCT No.: PCT/CA2023/050471
§ 371 (c)(1),
(2) Date: Sep. 12, 2024

(87) PCT Pub. No.: WO2023/193107
PCT Pub. Date: Oct. 12, 2023

(65) Prior Publication Data

US 2025/0205950 A1 Jun. 26, 2025

Related U.S. Application Data

(60) Provisional application No. 63/362,669, filed on Apr. 8, 2022.

(51) Int. Cl.
*B29C 45/78* (2006.01)
*B29C 45/27* (2006.01)

(52) U.S. Cl.
CPC .......... *B29C 45/78* (2013.01); *B29C 45/2737* (2013.01); *B29C 2045/274* (2013.01);
(Continued)

(58) Field of Classification Search
CPC ................ B29C 45/78; B29C 45/2737; B29C 2045/274; B29C 2045/2741; B29C 2045/2754; B29C 2945/76274
See application file for complete search history.

(56) References Cited

U.S. PATENT DOCUMENTS 5,853,631 A 12/1998 Linehan
2003/0154004 A1* 8/2003 Kroeger ............ G05D 23/1934 700/202
2016/0297130 A1* 10/2016 Esser ................. B29C 45/2725

FOREIGN PATENT DOCUMENTS

CA 2313203 A1 7/1999
CA 2544666 A1 12/2005
(Continued)

OTHER PUBLICATIONS

WIPO: International Search Report and Written Opinion relating to PCT application No. PCT/CA2023/050471, dated Jul. 4, 2023.
(Continued)

*Primary Examiner* — Atul P. Khare
(74) *Attorney, Agent, or Firm* — Rowand LLP

(57) ABSTRACT

An injection molding system is disclosed. The injection molding system includes: a hot runner including: a plurality of heaters arranged into one or more defined heating zones within the hot runner; and at least one temperature sensor associated with each heating zone, and a system controller coupled to the plurality of heaters, the system controller being configured to: for each heating zone: determine a first control gain value associated with the heating zone; determine a total heater power of heaters associated with the heating zone; calculate a relative weight associated with the heating zone based on the first control gain value and the total heater power; and determine a zone type associated with the heating zone based on the relative weight.

20 Claims, 7 Drawing Sheets

(52) U.S. Cl.
CPC ................. *B29C 2045/2754* (2013.01); *B29C 2945/7604* (2013.01); *B29C 2945/76274* (2013.01); *B29C 2945/7628* (2013.01); *B29C 2945/76454* (2013.01); *B29C 2945/76531* (2013.01); *B29C 2945/76759* (2013.01); *B29C 2945/76969* (2013.01)

(56) References Cited

FOREIGN PATENT DOCUMENTS

| | | | | | |
|---|---|---|---|---|---|
| JP | H09150444 A | * | 6/1997 | ............ | B29C 45/78 |
| JP | 3197864 B2 | | 8/2001 | | |
| JP | 2002205320 A | | 7/2002 | | |

OTHER PUBLICATIONS

EPO: Extended European Search Report relating to EP application No. 23784041.8, dated Apr. 8, 2026.

* cited by examiner

METHODS FOR DETERMINING ZONE TYPES OF HEATING ZONES IN AN INJECTION MOLDING SYSTEM

TECHNICAL FIELD

The present disclosure relates to injection molding and, in particular, to methods for heating a hot runner of an injection molding system.

BACKGROUND

Hot runners are widely used in injection molding machines. A hot runner assembly generally includes, at least, a heated manifold and one or more injection nozzles. The manifold distributes melt (e.g., molten plastic) to the injection nozzles via a network of melt channels within the manifold. The injection nozzles then deliver the melt to one or more corresponding mold cavities.

A hot runner includes heating elements which may be, for example, coil heaters, nozzle heaters, tubular heaters, and the like. By way of example, the melt in each melt channel of a manifold may be heated using cartridge heaters located on the exterior of the manifold. The heating elements may be disposed in a plurality of temperature-controlled "heating zones". The heating zones of a hot runner may heat up at different rates. It is desirable to heat, tune, and otherwise control multi-zone hot runners in an intelligent manner to ensure high molded part quality and long-term production.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
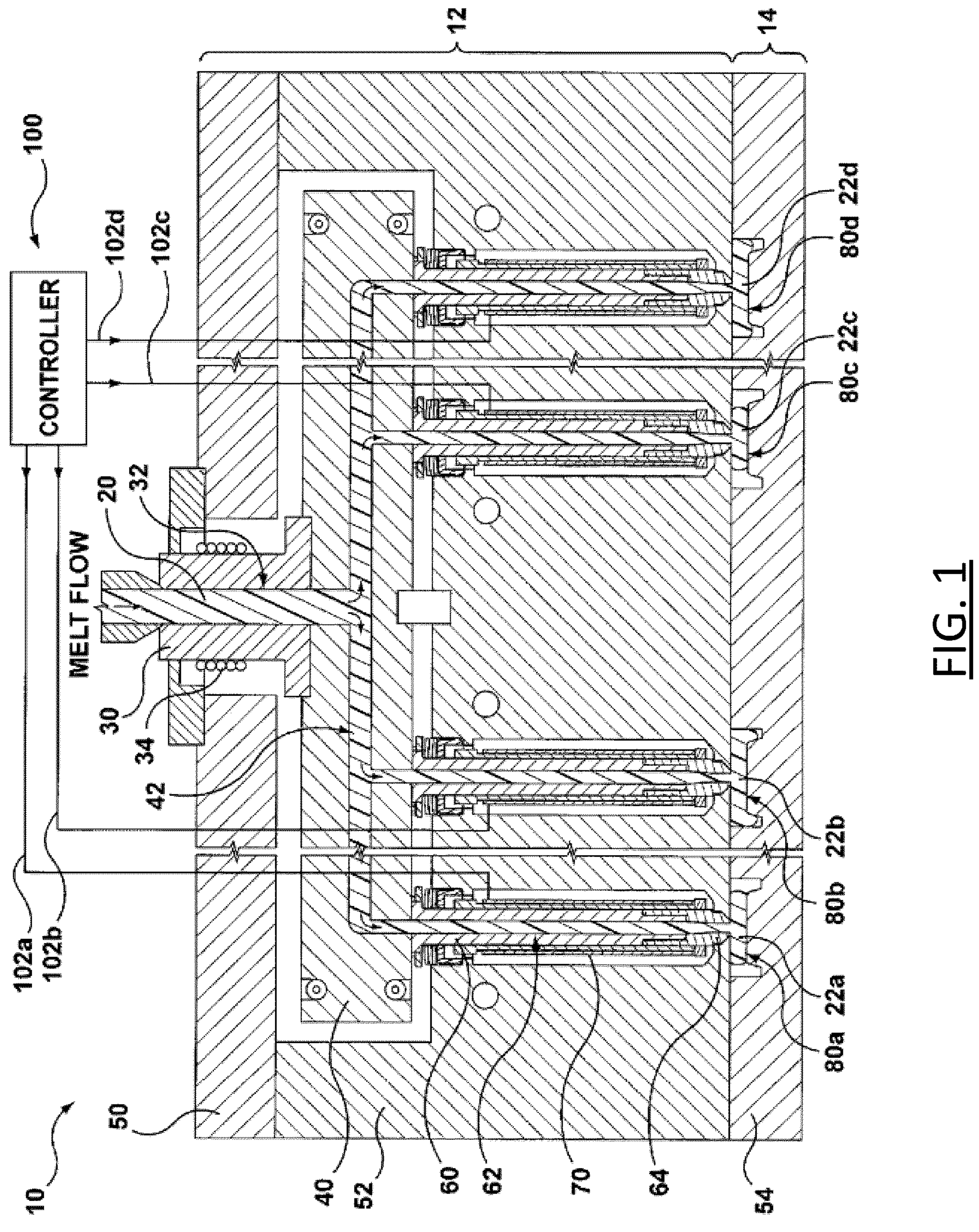
FIG. 1 shows a cross-sectional view of an example injection molding system.

In an aspect, the present disclosure describes an injection molding system. The injection molding system includes a mold and a hot runner including: a manifold; one or more injection nozzles coupled to the manifold; a plurality of heaters in thermal contact with the manifold and the one or more injection nozzles, the heaters being arranged into one or more defined heating zones within the hot runner; and at least one temperature sensor associated with each heating zone, and a system controller coupled to the plurality of heaters, the system controller being configured to: for each heating zone: determine a setpoint temperature associated with the heating zone; obtain, via a temperature sensor, measurement of a current local temperature of the heating zone; determine a control gain value associated with the heating zone; and compute a predicted heating time for the heating zone based on the setpoint temperature, the current local temperature, and the control gain value, determine a heating schedule for the hot runner based on the predicted heating times for the heating zones; and operate the plurality of heaters in accordance with the heating schedule.

In some implementations, the at least one temperature sensor may be a thermocouple.

In some implementations, the system controller may be configured to receive, via an input device, user input indicating setpoint temperatures associated with the heating zones.

In some implementations, the system controller may be configured to obtain, from a remote data source, stored values of setpoint temperatures associated with the heating zones.

In some implementations, each heater may be associated with at least one of the heating zones.

In some implementations, the injection molding system may include a plurality of temperature controllers, and each temperature controller may be associated with a respective heating zone and operably connected to at least one of the heaters.

In some implementations, each temperature controller may be a proportional-integral-derivative (PID) controller.

In some implementations, the control gain value may be an integral gain of the PID controller.

In some implementations, the heating schedule may include a schedule for operating the plurality of heaters, the heating schedule indicating, for each heating zone, a start time for raising temperature of heaters that are associated with the heating zone.

In some implementations, determining the heating schedule comprises: identifying one or more first heating zones of a first type; determining a desired setpoint time for the one or more first heating zones; and determining, for each of the first heating zones, a start time for raising temperature of heaters that are associated with the first heating zone such that a local temperature of the first heating zone reaches a respective setpoint temperature at the desired setpoint time.

In some implementations, the system controller may be configured to receive, via an input device, user input indicating the desired setpoint time for the first heating zones.

In some implementations, identifying the one or more first heating zones of the first type may include identifying those heating zones in which at least one injection nozzle is located.

In some implementations, identifying the one or more first heating zones of the first type may include identifying those heating zones in which at least a part of the manifold is located.

In some implementations, the heating schedule may indicate relative start times for raising temperature of heaters associated with different ones of the heating zones.

In some implementations, the system controller may be configured to receive zone definition data identifying the one or more heating zones within the hot runner.

In another aspect, the present disclosure describes an injection molding system. The injection molding system includes: a hot runner including: a plurality of heaters arranged into one or more defined heating zones within the hot runner; and at least one temperature sensor associated with each heating zone, and a system controller coupled to the plurality of heaters, the system controller being configured to: for each heating zone: determine a first control gain value associated with the heating zone; determine a total heater power of heaters associated with the heating zone; calculate a relative weight associated with the heating zone based on the first control gain value and the total heater power; and determine a zone type associated with the heating zone based on the relative weight.

In some implementations, the zone type associated with the heating zone may be one of: a manifold heating zone; a nozzle tip heating zone; a sprue bushing heating zone; a barrel heating zone; a probe heating zone; or a shooting pot heating zone.

In some implementations, calculating the relative weight associated with the heating zone may include computing a gain-power product of the first control gain value and the total heater power.

In some implementations, the system controller may be further configured to determine a sorted list of the heating zones based on ordering the heating zones by their respective gain-power products.

In some implementations, the system controller may be further configured to parse the sorted list of the heating zones at delineator values.

In some implementations, the system controller may be further configured to identify a plurality of heating zones in which at least a part of a manifold is located.

In yet another aspect, the present disclosure describes processor-implemented method for operating an injection molding machine having a hot runner. The method includes: for each of a plurality of defined heating zones within the hot runner: determining a first control gain value associated with the heating zone; determining a total heater power of heaters associated with the heating zone; calculating a relative weight associated with the heating zone based on the first control gain value and the total heater power; and determining a zone type associated with the heating zone based on the relative weight.

Other example embodiments of the present disclosure will be apparent to those of ordinary skill in the art from a review of the following detailed descriptions in conjunction with the drawings.

The present application relates to temperature control in injection molding systems. Controlled temperatures are crucial for obtaining structurally sound and aesthetically acceptable molded parts. Hot runners include heater components which may be disposed at various locations such as, for example, along a manifold and around injection nozzles. The temperature profile for a hot runner must be set up carefully to ensure that material (e.g., thermoplastic polymers, glasses, etc.) is thoroughly melted and mixed but not allowed to burn. Inadequate or excessive heating can lead to flaws in the finished molded product and may also cause physical damage to the injection molding machine itself.

During a molding cycle, there are certain points where the amount of time must be controlled precisely in order to achieve desired results for a molded part. In particular, residence time, or the amount of time that molten material remains in the hot runner, must be set such that the material is not heated for too long or prematurely removed. For example, resin material can degrade within the hot runner due to excessive melt temperature and long residence time. As such, it is important to carefully monitor how long heat-sensitive resin is exposed to processing temperatures.

An injection molding machine may include a plurality of "heating zones". A heating zone refers to an area of an injection molding machine for which a local temperature (e.g., internal or surface temperature of component(s) located in the heating zone) can be controlled independently of other areas of the injection molding machine. The mass of the mold and runner system of an injection molding machine may be divided into multiple heating zones.

The heating elements of an injection molding machine may be located in different heating zones, and each heating zone may be associated with a respective temperature controller that is configured for controlling the heating elements in that zone. A temperature controller may incorporate closed loop feedback control of heating elements. In particular, a temperature controller for a heating zone may be a proportional-integral-derivative (PID) controller, a control loop mechanism. A temperature controller may obtain measurements of the local temperature of a heating zone and generate heater power output based on the measurements.

The heating zones of an injection molding machine may heat up at different rates. In some instances, it is desirable for certain heating zones to reach their respective setpoints at the same or nearly the same time. If, for example, one or more injection nozzles were to reach a temperature required for an injection molding procedure long before other ones of the injection nozzles reach their respective setpoint temperatures, the resin may degrade in the heating zones that reach their setpoints early.

Some hot runner components (e.g., a manifold, injection nozzles, and the like) may span multiple heating zones. That is, a component may include parts that are located in different heating zones. To achieve stable and robust molding conditions, it is important that the temperature distribution for hot runner components be as uniform as possible. Accordingly, it is further desirable to identify heating zones of the same or similar zone type and apply a common heat up strategy for such heating zones.

In an aspect, the present application discloses methods for scheduling heat up of multiple heating zones in an injection molding system. For each heating zone, a predicted heat up time may be determined based on a setpoint temperature, actual local temperature (as measured by a temperature sensor), and an integral gain of a PID controller for the heating zone. Based on the predicted heating times, the heat up for each heating zone may be scheduled. In particular, the heat up may be scheduled such that certain heating zones reach their respective setpoints at the same or nearly the same time. A scheduled heat up of heating zones may advantageously result in energy savings and reduction of peak power draw for an injection molding system.

In another aspect, the present application discloses techniques for determining zone types of heating zones in an injection molding system. In particular, the heating zones of an injection molding machine may be classified based on their zone type. For example, heating zones that include nozzle tips may be distinguished from heating zones that include parts of a manifold. The zone type information may be useful for coordinating heat up of certain hot runner components (e.g., nozzle tips) in order to reduce residence time and prevent degradation of resin. According to the disclosed techniques, a measured amount of power is supplied to each heating zone and the local temperature of the heating zones are monitored. Once the local temperature of a heating zone has increased sufficiently, the flow of power is stopped. The increase in temperature resulting from the supplied energy and the amount of energy added may be used to determine the relative physical weight of the heating zone. The relative weight information for a heating zone may, in turn, inform the zone type classification for that heating zone.

In yet another aspect, the present application discloses a technique for enabling heating zones to converge on their respective setpoint temperatures at the same or nearly the same time. The heating zones of an injection molding machine may each be associated with a respective temperature controller, such as a PID controller. The temperature controller is associated with a PID curve, and the heater output power for the heating zone is controlled based on the PID curve. A heating zone may enter a "saturation" state if the heaters associated with the heating zone are operating at maximum power. If a heating zone becomes "saturated", the heat up rate for that zone may be used for all other heating zones. In this way, "saturation" is used to identify slow heating zones-once a particular heating zone enters saturation, it is effectively identified as the "slowest" zone and its heat up rate information is shared with the other heating zones so that all zones can track to the slowest heating zone. The evaluation of whether a heating zone is saturated continues and, if another heating zone later becomes saturated, the other heating zones track to the newly saturated zone. Since all heating zones heat up according to the slowest zone, they are able to converge to their setpoint temperatures at the same or nearly the same time.

In yet another aspect, the present application discloses a technique for harmonizing heat up across multiple heating zones. Initially, each temperature controller may operate according to its own PID curve. That is, every heating zone may be independently tuned initially. A system controller then obtains the integral gain from each PID controller and identifies a lowest one of the integral gains. This lowest integral gain is then shared with all of the heating zones so that all heating zones can heat up along the same curve as the zone associated with the lowest integral gain.

Reference is first made to FIG. 1, which shows an example injection molding system 10 for the production of injection molded parts from a melt 20. The injection molding system includes a hot runner 12 with a number of injection nozzles positioned in alignment with corresponding mold cavities 14. The hot runner 12 includes a sprue bushing 30 having a channel 32 through which the melt enters. A heater 34 surrounds a portion of the sprue bushing. The heater 34 generates heat so as to maintain an appropriate temperature within the sprue bushing for the melt to flow toward the manifold 40. It should be appreciated that multiple mold cavities to create a multitude of molded parts, or a single mold cavity to create a large molded part may be employed, such that depending on context, "mold cavities" may refer to a plurality of mold cavities or a plurality of sections of a single mold cavity.

The manifold 40 is supported on opposite sides by manifold plates 50, 52. The manifold 40 includes a channel 42 through which the melt flows. The channel 42 branches off into separate passageways for distribution of the melt to separate injection nozzles 60. The hot runner may include any suitable number of injection nozzles, each arranged to dispense melt into a corresponding mold cavity 80. In some embodiments, multiple injection nozzles may be arranged to dispense melt into the same mold cavity.

Each injection nozzle 60 includes a nozzle body having a channel 62 and a nozzle tip 64 disposed at the end of the nozzle body. Melt 20 distributed from the manifold into each injection nozzle flows through the channel 62 and out of the tip 64 of the respective injection nozzle toward corresponding mold cavities 80. Heaters 70 are disposed adjacent to and surround a portion of the injection nozzle. The heaters 70 generate heat so as to maintain the melt flowing through the channel 62 at an appropriate temperature within the injection nozzle and for exit out the tip 64 toward the mold cavities 80.

A mold plate 54 supports each of the mold cavities 80*a*, 80*b*, 80*c*, 80*d* against manifold plate 52. The melt is dispensed from each of the respective injection nozzles and flows into the space provided by each of the corresponding mold cavities.

In some embodiments, the system controller 100 may provide signals to heaters 70 for raising, lowering, and/or maintaining the temperature of heat of the respective injection nozzles and of the melt within the injection nozzles. As shown in the example of FIG. 1, transmission lines 102*a*, 102*b*, 102*c*, 102*d* provide signals from the system controller 100 to respective heaters 70. Accordingly, the temperature of the injection nozzles 60 may be kept at a certain range based on the heat input in to the heaters 70.

More generally, the system controller 100 may be communicably coupled to a plurality of temperature controllers (not illustrated in FIG. 1) that are each associated with a respective heating zone of the injection molding system 10. In particular, the hot runner 12 may be divided into one or more heating zones. The heaters (e.g., heaters 34, 70) that are disposed in a heating zone may be in thermal contact with one or more of the components (e.g., manifold, injection nozzles, and the like) located in the heating zone and controlled by a temperature controller that is associated with that heating zone.

The temperature conditions of each injection nozzle ultimately affect the amount of melt 22*a-d* that is dispensed into each mold cavity 80*a-d*. For example, temperature conditions may affect the rate at which the melt flows through the injection nozzle and, hence, the rate of fill into the mold cavities and the amount of dispensed melt that ultimately flows into each mold cavity. Temperature conditions at certain regions within each injection nozzle may also affect the quality of melt that is dispensed into the mold cavity, such as the uniformity of the melt as it exits out of the tip of the injection nozzle. In FIG. 1, any adjustments to the heaters 70 may affect both the amount of dispensed melt that flows into each mold cavity and the quality of the melt upon exit from the injection nozzle.

Figure 2A:
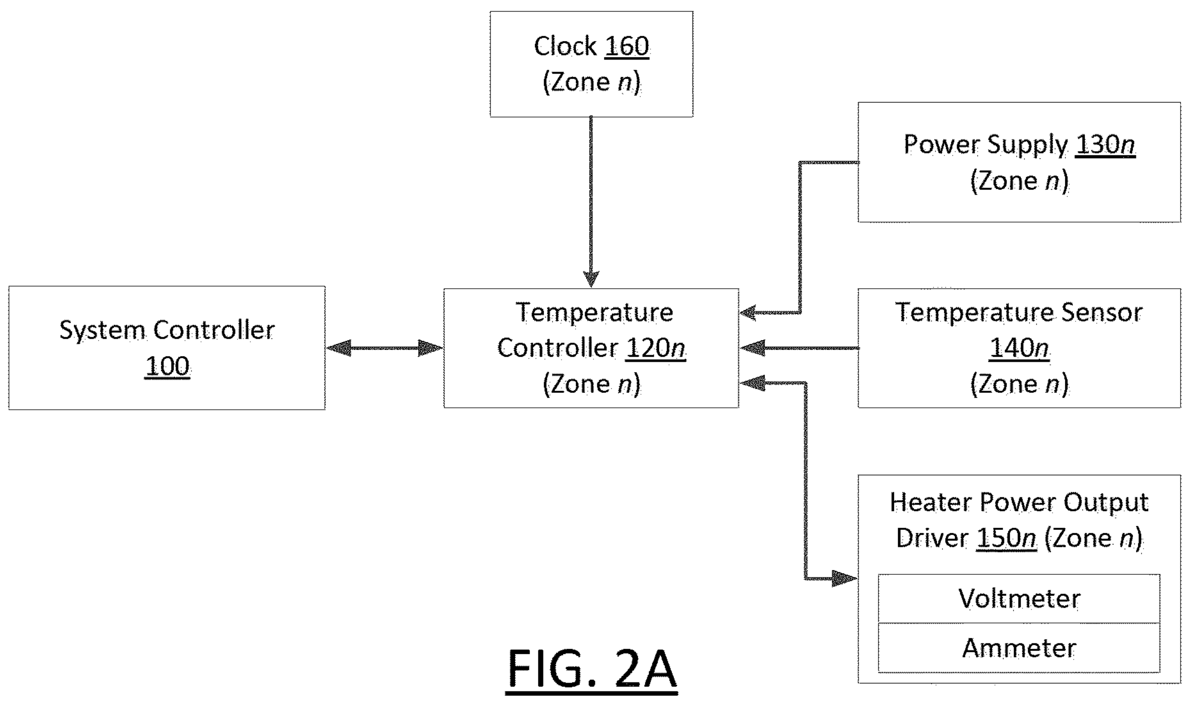
FIG. 2A is a schematic diagram illustrating example components for controlling a hot runner of an injection molding system.

FIG. 2A is a schematic diagram illustrating example components for controlling a hot runner of an injection molding system. The system controller 100 may control overall operations of a hot runner. Specifically, the system controller 100 may be configured to control heat up of heating zones within a hot runner. The system controller 100 is communicably coupled to temperature controllers 120 associated with a plurality of heating zones. Each temperature controller 120*n* may be assigned to a respective heating zone. The temperature controller 120*n* for a heating zone n is configured to obtain temperature measurements within the heating zone and coordinate power output of heaters that are disposed in the heating zone. As such, the temperature controller 120*n* may be coupled to, at least, a power supply 130*n*, a temperature sensor (e.g., a thermocouple) 140*n*, and heater power output driver 150*n* for powering one or more heaters. The heater power output driver is configured to measure the current flowing to the heater and voltage applied, and thus the power may be known. The temperature controller 120*n* may additionally receive timestamp data from a clock 160 which may be shared across the heating zones of a hot runner.

Figure 2B:
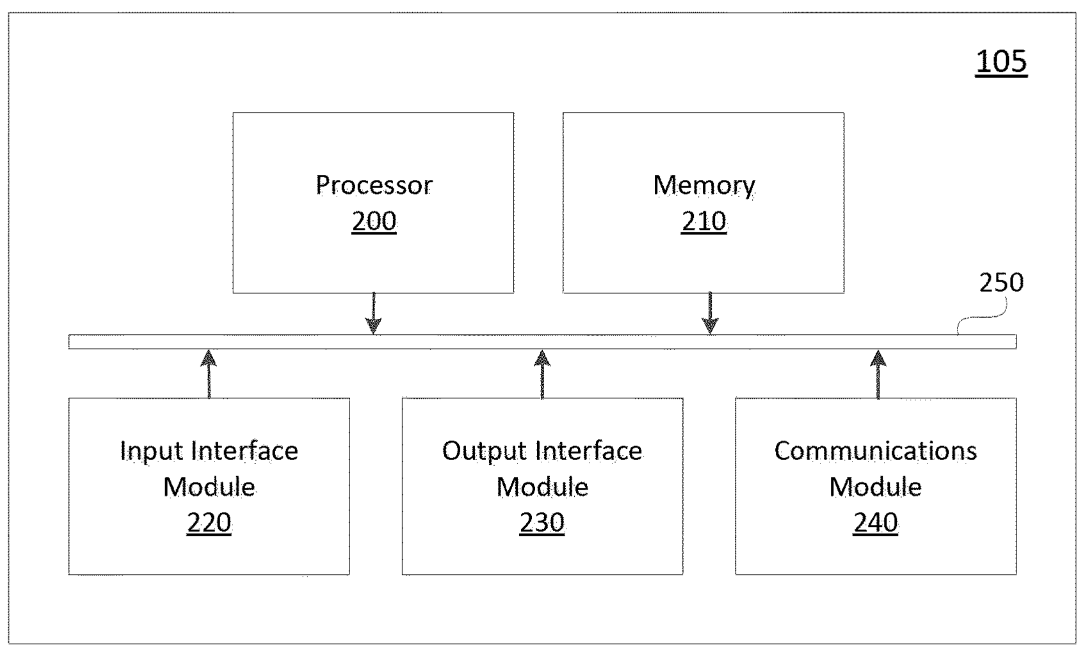
FIG. 2B is a high-level schematic diagram of a computing device.

FIG. 2B is a high-level operation diagram of an example computing device 105. In at least some embodiments, the example computing device 105 may be exemplary of the system controller 100 and/or the temperature controller 120. The example computing device 105 includes a variety of modules. For example, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor and may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example, allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the example computing device 105 to communicate using near-field communication (NFC), via Wi-Fi™, using Bluetooth™, or via some combination of one or more networks or protocols. Additionally, or alternatively, the communications module 240 may allow the example computing device 105 to communicate over copper transmission-line, optical or acoustic media via some combination of one or more networks or protocols such as Ethernet™.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 3:
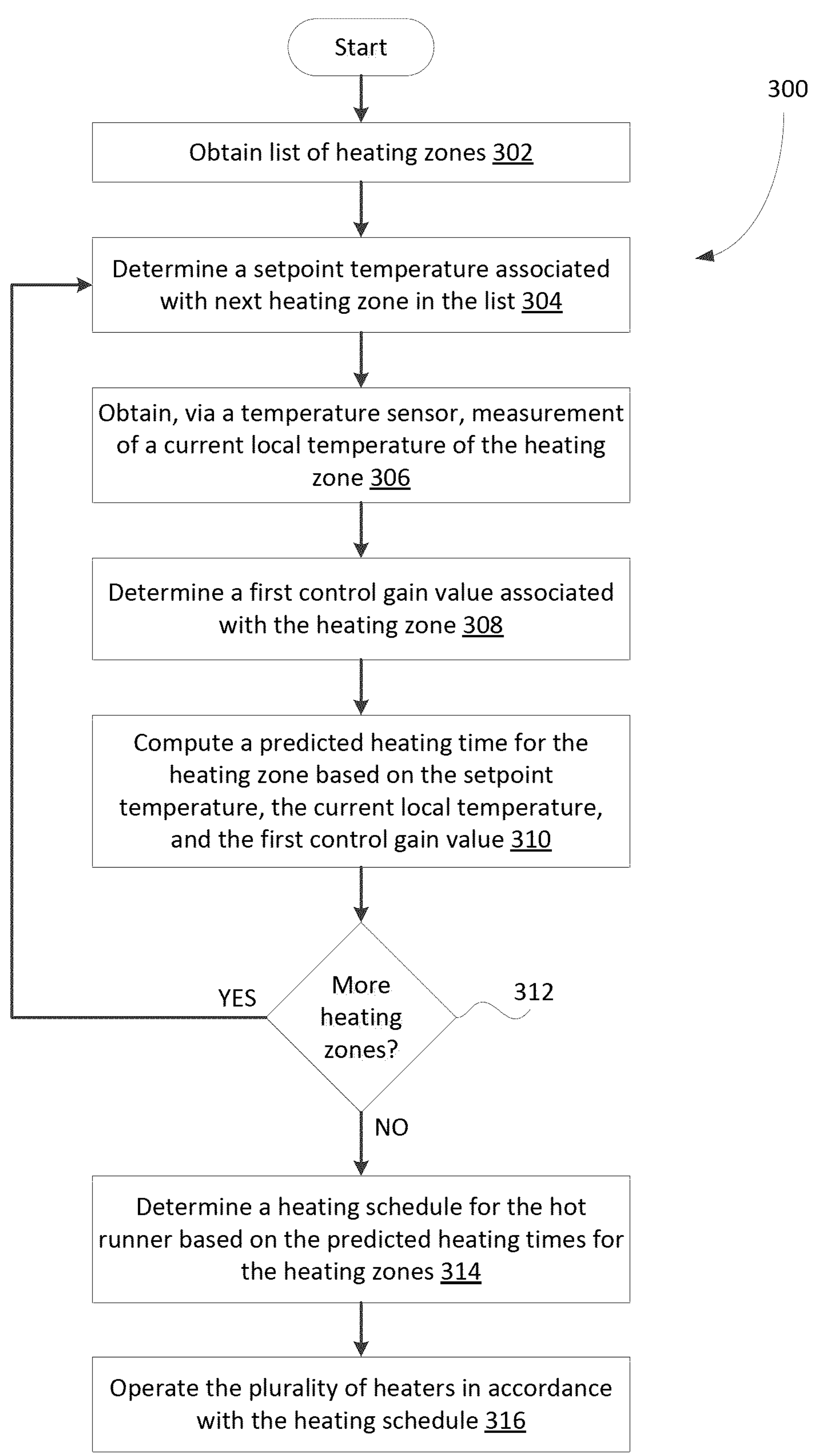
FIG. 3 shows, in flowchart form, an example method for controllably heating a multi-zone hot runner.

Reference is now made to FIG. 3, which shows, in flowchart form, an example method 300 for controllably heating a multi-zone hot runner of an injection molding system. The method 300 may be implemented by a controller of an injection molding system, such as the system controller 100 of FIGS. 1 and 2. In particular, a computing system that is communicably coupled with and configured to control temperature controllers of various heating zones in an injection molding machine may implement the method 300. Operations starting with operation 302 and continuing onward may be performed, for example, by one or more processors (e.g., a microprocessor) of a computing device executing software comprising instructions such as may be stored in a memory of the computing device. Specifically, processor-executable instructions may, when executed, configure a processor to perform all or parts of the method 300.

In operation 302, the system controller obtains a list of heating zones of the injection molding system. The heating zones may be defined based on factors relating to components of the injection molding machine such as, for example, type, volume, and location of the components. A user may manually input to the injection molding system, via an input device, custom definitions of heating zones. Additionally, or alternatively, the system controller may query a remote computer to obtain the list of heating zones. For example, heating zone information for an injection molding machine may be stored in a database that is accessible by the system controller. The heating zone information for an injection molding machine may indicate, among others, the number of heating zones, identifiers of the heating zones, types and identifiers of heaters in each of the heating zones, and identifiers of temperature controllers and sensors that are associated with each of the heating zones.

For each heating zone in the list, the system controller determines a setpoint temperature associated with the heating zone, in operation 304. The setpoint temperature for a heating zone represents a desired or target value for the local temperature of the heating zone. The setpoint temperatures may be defined, for example, based on user-inputted values to the injection molding system. For example, an operator of the injection molding machine may specify, via an input device, setpoint temperatures associated with one or more of the heating zones (or components within the heating zones). Additionally, or alternatively, the setpoint temperatures may be determined by querying a data source. In particular, the system controller may be configured to obtain, from a remote data source, stored values of setpoint temperatures associated with the heating zones of an injection molding machine.

In operation 306, the system controller obtains, via a temperature sensor associated with the heating zone, a measurement of a current local temperature. The temperature sensor may, for example, be a thermocouple that is in thermal contact with one or more of the components in the heating zone. The system controller may directly poll a temperature sensor associated with the heating zone to obtain a current local temperature measurement.

As discussed above, each heating zone may be associated with a temperature controller that is configured to control one or more heaters for the heating zone. Specifically, a temperature controller may control power output to the one or more heaters. The temperature controller may be a control loop mechanism employing feedback. In at least some embodiments, the temperature controller may be a proportional-integral-derivative (PID) controller. A PID temperature controller operates based on a formula to calculate a difference between a setpoint and current process (i.e., local) temperature of a heating zone, then predicts how much power to use in subsequent process cycles. Specifically, the PID controller continuously calculates an error value and applies a correction based on proportional, integral, and derivative control terms. In this way, the PID controller may be used to minimize the error value over time and ensure that the process temperature remains as close to the setpoint as possible. If tuned properly, a temperature controller with PID can compensate for process disturbances and bring the process temperature back toward the setpoint with minimal delay and overshoot.

In operation 308, the system controller determines a control gain value associated with the heating zone. The system controller may, for example, poll the temperature controller for the heating zone to obtain a current value of a specific control term. In at least some embodiments, the temperature controller may be a PID controller, and the control gain value may be an integral control term for the PID controller. That is, the system controller may obtain the integral control term, which accounts for past error values (i.e., the difference between setpoint and measured local temperature), from the PID controller associated with the heating zone.

Upon determining the setpoint temperature, the current local temperature, and control gain value, the system controller can compute a predicted heating time for the heating zone. In particular, the system controller may determine an estimate of the heat up time for the local temperature of the heating zone to reach the setpoint temperature based on the relevant control loop mechanism. By way of example, the system controller may compute the predicted heat up time based on the setpoint temperature, the current local temperature, and the integral control term of a PID controller associated with the heating zone.

The system controller iterates through the heating zones of the injection molding system in this way to compute predicted heat up times for all of the heating zones. Specifically, the system controller checks, in operation 312, whether there are other heating zones that have not been processed. For each heating zone, the system controller repeats the operations 304 to 310 to compute the respective heat up time for the heating zone.

Once the heat up times for all of the heating zones have been computed, the system controller determines a heating schedule for the hot runner of the injection molding system, in operation 314. The heating schedule includes scheduling information for operating heaters associated with heating zones of the injection molding system. In at least some embodiments, the heating schedule may indicate, for each of the heating zones, a start time for raising temperature of the heaters that are associated with the heating zone. Specifically, a heating schedule may indicate when to begin heat up of each of the heating zones.

In some embodiments, the heating schedule may be determined so that at least a subset of the heating zones of an injection molding system reach their setpoint at the same or nearly the same time. That is, the system controller may schedule heat up of the heating zones by coordinating setpoint times (i.e., the time when the process temperature reaches the setpoint) for the heating zones.

By way of example, the system controller may attempt to coordinate the heat up of a subset of the heating zones that are of a specific type. The system controller may first identify one or more first heating zones of a first type. For example, the system controller may identify heating zones that include certain components. The first heating zones may, for example, be the heating zones in which at least one injection nozzle is located. As another example, the first heating zones may be the heating zones in which at least a part of a manifold is located.

The system controller can then determine a desired setpoint time for the one or more first heating zones and determine start times for heat up of the first heating zones. In particular, the system controller may determine, for each of the first heating zones, a start time for raising temperature of heaters that are associated with the first heating zone such that a local temperature of the first heating zone reaches a respective setpoint temperature at the desired setpoint time. The heating schedule may thus present heat up start times for the first heating zones. The start times indicated in the heating schedule may be expressed as relative times (e.g., Zone A heat up starts 10 minutes after Zone B heat up). Alternatively, the start times may be indicated in absolute terms (e.g., Zone A heat up starts at 7:05 pm).

The setpoint time may be automatically determined by the system controller, or it may be manually specified by an operator. For example, the system controller may be configured to receive, via an input device, user input indicating a desired setpoint time for each of one or more of the first heating zones.

In some embodiments, the heating schedule may be determined so as to coordinate the heat up of all heating zones. That is, the system controller may determine heat up start times for all of the heating zones of an injection molding machine. For example, the heating schedule may indicate start times so that all heating zones reach their setpoint at the same or nearly the same time.

In operation 316, the system controller operates the plurality of heaters in accordance with the heating schedule. Specifically, the system controller causes temperature of the heaters to rise based on the heat up start times as indicated in the heating schedule. In at least some embodiments, the system controller may generate control signals for transmitting to temperature controllers associated with the heating zones. The control signals may indicate, at least, start times for heat up (e.g., heating, or raising power provided, to heaters) of the heating zones. Additionally, the control signals may identify the heaters that are to be powered up for heat up of a heating zone. The system controller may transmit the control signals to the temperature controllers in advance of the scheduled heat up start times or at the respective time of starting heat up of the heating zones.

Figure 4:
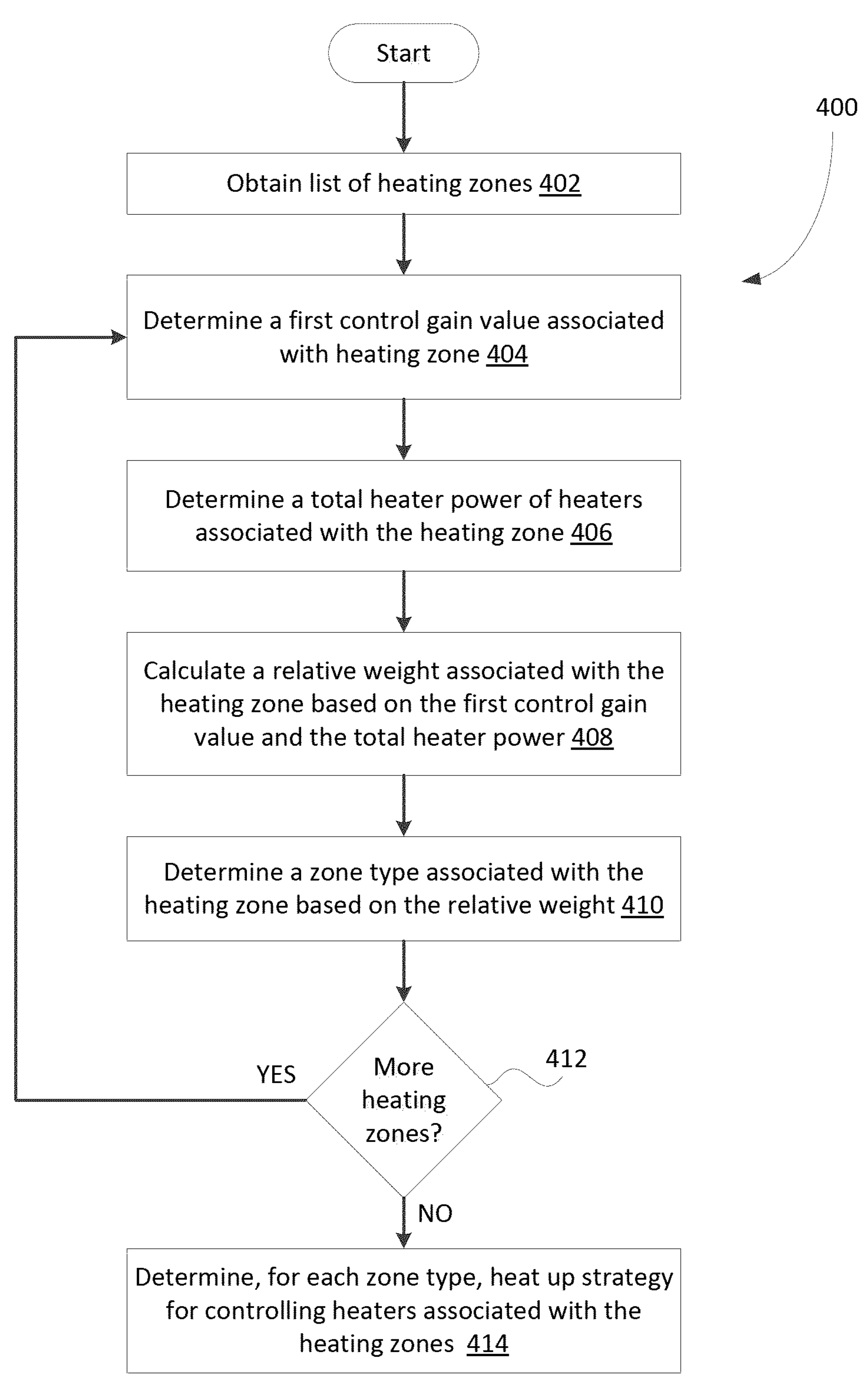
FIG. 4 shows, in flowchart form, an example method for determining zone types of heating zones in a multi-zone hot runner.

Reference is now made to FIG. 4, which shows, in flowchart form, an example method 400 for determining zone types of heating zones in a multi-zone hot runner of an injection molding system. The method 400 may be implemented by a controller of an injection molding system, such as the system controller 100 of FIGS. 1 and 2. Operations starting with operation 402 and continuing onward may be performed, for example, by one or more processors (e.g., a microprocessor) of a computing device executing software comprising instructions such as may be stored in a memory of the computing device. The operations of method 400 may be performed in addition to, or as alternatives of, one or more of the operations of method 300.

In operation 402, the system controller obtains a list of heating zones of the injection molding system. The heating zones may be defined based on factors relating to components of the injection molding machine such as, for example, type, volume, and location of the components. A user may manually input to the injection molding system, via an input device, custom definitions of heating zones. Additionally, or alternatively, the system controller may query a remote computer to obtain the list of heating zones. For example, heating zone information for an injection molding machine may be stored in a database that is accessible by the system controller. The heating zone information for an injection molding machine may indicate, among others, the number of heating zones, identifiers of the heating zones, types and identifiers of heaters in each of the heating zones, and identifiers of temperature controllers and sensors that are associated with each of the heating zones.

For each heating zone in the list, the system controller determines a first control gain value associated with the heating zone, in operation 404. In at least some embodiments, each heating zone may have a respective temperature controller. In particular, the temperature controller may be a PID controller. The first control gain value may, then, be a proportional gain of the PID controller associated with the heating zone. More generally, the first control gain value may be a well-tuned proportional gain used in a control loop for the heating zone.

Generally, a PID controller or other control mechanism calculates an output as a fraction of the power that is potentially available. For example, a PID controller may assess an output power expressed as a percentage (e.g., 43%). This may be a duty cycle or some other relative power regulation means. The actual output power would depend on the heater that is connected to the PID controller and the supply voltage available. In some embodiments, a PID controller may be configured to effectively compute an output in terms of actual power (e.g., in terms of wattage). Instead of using a traditional proportional gain parameter, a system controller may use the product of proportional gain and available heater wattage as the control gain value in a traditional PID controller.

In operation 406, the system controller determines a total heater power of heaters that are associated with the heating zone. The total heater power represents a total amount of power that is supplied to heaters that are configured for heating at least parts of the heating zone. For example, the total heater power may be determined by calculating a sum of the electrical power supplied to all of the heaters in a heating zone.

In operation 408, the system controller calculates a relative weight associated with the heating zone based on the first control gain value and the total heater power. In at least some embodiments, the system controller may calculate a gain-power product that is a product of the first control gain value and the total heater power. For example, the gain-power product may be a product of the proportional gain of the PID controller for the heating zone and the total heater power.

The system controller then determines a zone type associated with the heating zone based on the calculated relative weight, in operation 410. In particular, the system controller may access stored heating zone information and compare the calculated relative weight with known relative weight values of various different heating zone types. The zone type of the heating zone may be any one of: a manifold heating zone; a nozzle tip heating zone; a sprue bushing heating zone; a barrel heating zone; a probe heating zone; or a shooting pot heating zone.

In this way, the system controller may process zone type detection for a plurality of heating zones. If, in operation 412, there are no more heating zones to process, the system controller may proceed to determine heat up strategies for the heating zones based on the detected zone types. Specifically, the system controller may determine, for each zone type, heat up strategies for controlling heaters associated with the heating zones of the zone type, in operation 414.

By way of example, the system controller may identify a plurality of heating zones that are of a "manifold heating zone" type, e.g., heating zones in which at least a part of a manifold is located. A heat up strategy for the manifold heating zone type may then be applied to the identified heating zones of that zone type. This may allow the heating zones that are identified as being associated with a manifold to be heated evenly, by applying a heating strategy for heat up as a cohesive unit with minimal zone-to-zone temperature variation. Similarly, heat up strategies for other zone types (e.g., tips, nozzles, bushing, etc.) may enable the heating zones associated with a particular runner component to be heated in a cohesive and/or uniform manner.

Figure 5:
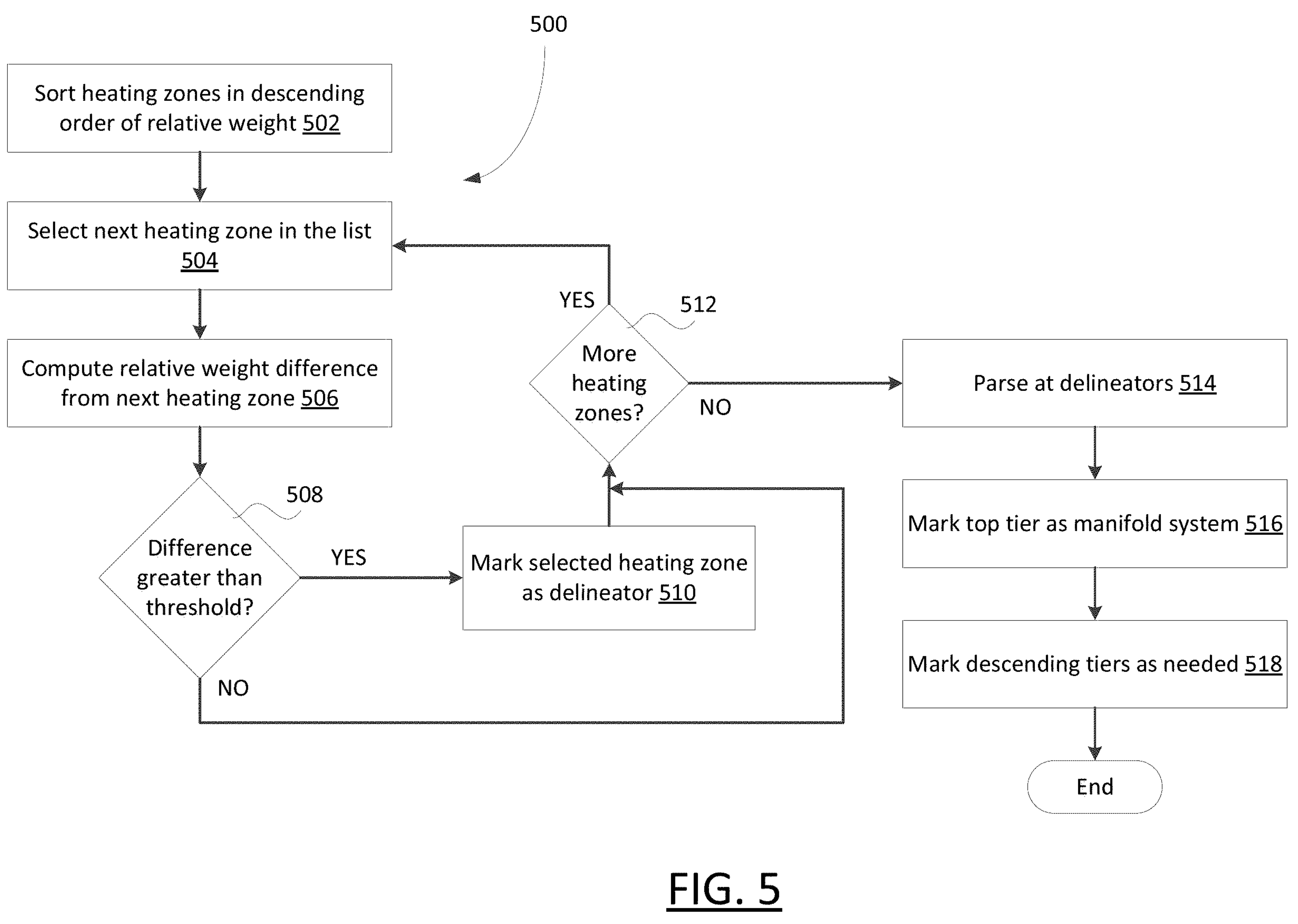
FIG. 5 shows, in flowchart form, another example method for determining zone types of heating zones in a multi-zone hot runner.

Reference is now made to FIG. 5, which shows, in flowchart form, another example method 500 for determining zone types of heating zones in a multi-zone hot runner of an injection molding system. The method 500 may be implemented by a controller of an injection molding system, such as the system controller 100 of FIGS. 1 and 2. Operations starting with operation 502 and continuing onward may be performed, for example, by one or more processors (e.g., a microprocessor) of a computing device executing software comprising instructions such as may be stored in a memory of the computing device. The operations of method 500 may be performed in addition to, or as alternatives of, one or more of the operations of methods 300 and 400.

The system controller may determine, for each of a plurality of heating zones in an injection molding system, a relative weight. For example, the system controller may obtain, from a data source, stored values of relative weight for the zone construction of the heating zones. Additionally, or alternatively, the system controller may cause defined amount of power to be provided to heaters in each of the heating zones and determine, based on changes in local temperature resulting from the supplied heat energy, the relative weight for each heating zone. In particular, a predefined amount of power may be provided for certain fixed period of time to the heaters of a heating zone, and measured values of the local temperature may be monitored in order to determine change in temperature. The heat capacities of the heating zones may be determined by iteratively performing such zone type detection heating for all of the heating zones.

In operation 502, the system controller sorts the heating zones in descending order of relative weight. Starting at operation 504, the system controller iterates through the list of heating zones and compares the heat capacities of consecutive heating zones in the determined order of relative weight.

Specifically, in operation 506, the system controller computes a relative weight difference between a selected heating zone and the next heating zone in the determined order. If the computed difference is greater than a predefined threshold value (operation 508), the system controller marks the selected heating zone as a "delineator" zone. For example, the system controller may store in memory an indicator identifying the selected heating zone as a delineator in association with the sorted list of heating zones.

Upon completing iteration through all of the heating zones of the injection molding machine, the system controller may proceed to determine which of the heating zones may be associated with a manifold system. In operation 514, the system controller may parse the sorted list of heating zones at the identified delineators. The "top" tier of heating zones, or the heating zones that precede the first instance of a delineator zone in the sorted list, may be associated with a manifold system. This technique of iterating through a sorted list of heating zones and identifying substantial differences in relative weight of heating zones may allow for efficient detection of zone types in an injection molding system. The zone type information may, in turn, facilitate developing tailored heat up strategies for applying to heating zones of the same type.

More generally, the system controller may be configured to determine whether adjacent heating zones in the sorted list are the same type of heating zone. In some embodiments, this assessment of adjacent heating zones may be based on the relative weight of the heating zones. In particular, the system controller may calculate a mathematical quotient based on the weights of adjacent heating zones in the sorted list and compare the quotient to a defined threshold value in order to determine whether said adjacent zones are of the same type. The system controller may thus calculate pairwise quotients using weights of adjacent heating zones in the sorted list and identify pairs of heating zones that are of the same type (e.g., pairs that have pairwise quotients that are less than a defined number). Similar techniques, such as calculating pairwise differences, sums, products, etc., for adjacent heating zones in the sorted list, may be employed in identifying zones of the same type.

Figure 6:
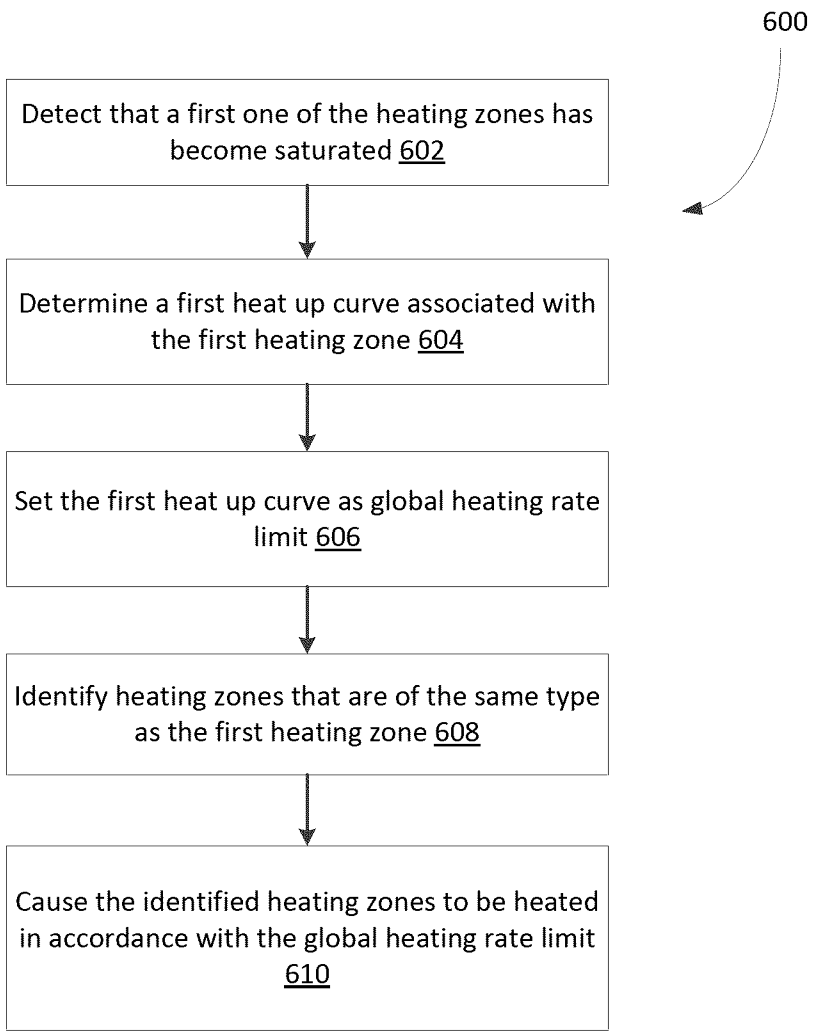
FIG. 6 shows, in flowchart form, an example method for controlling zone heating rates in a multi-zone hot runner.

Reference is now made to FIG. 6, which shows, in flowchart form, an example method 600 for controlling zone heating rates in a multi-zone hot runner of an injection molding system. The method 600 may be implemented by a controller of an injection molding system, such as the system controller 100 of FIGS. 1 and 2. Operations starting with operation 602 and continuing onward may be performed, for example, by one or more processors (e.g., a microprocessor) of a computing device executing software comprising instructions such as may be stored in a memory of the computing device. The operations of method 600 may be performed in addition to, or as alternatives of, one or more of the operations of methods 300 to 500.

As mentioned above, a temperature controller for a heating zone may be a PID controller. Each PID controller may initially operate according to its own heat up model, i.e., its own defined control terms of P, I, and D. A heating zone may enter a saturation state in which the heaters associated with the heating zone operate at maximum power. That is, the supplied power for the heaters of the saturated heating zone may not be increased. In operation 602, the system controller detects if any one of the heating zones has become saturated. If a heating zone is determined to be saturated, its heat up rate may be used for all other heating zones (or at least all other heating zones of the same type). In particular, the system controller determines the heat up rate associated with the saturated heating zone, in operation 604.

The "saturation" of a heating zone thus serves as a proxy for identifying slow heating zones—once a zone enters saturation state, its heat up rate is shared with other heating zones so that those zones can track to the saturated zone. In operation 606, the system controller sets the heat up rate as a heating rate limit for one or more other heating zones. The system controller then identifies heating zones that are of the same type as the saturated first heating zone (or all other heating zones) in operation 608, and causes the identified heating zones to be heated in accordance with that common heating rate limit.

Specifically, the power output to heaters of the one or more other heating zones may be governed by the rate limited heat up rate of the saturated heating zone. For example, the power output may be controlled such that the rate of temperature increase is capped by the global heating rate limit. The heating zones that are not saturated, in a sense, mimic saturation while the global heating rate limit is enforced. Effectively, this shifts each temperature controller from a PID loop in pursuit of a setpoint to a slope-following mode. Since the heating zones are forced to heat up according to the slowest heating zone, they may be able to converge on their respective setpoints at the same or nearly the same time.

As the slow heating zone approaches its setpoint, duty-cycle falls and the other heating zones shift from slope-following to resume their natural PID curve to their respective molding temperatures.

Figure 7:
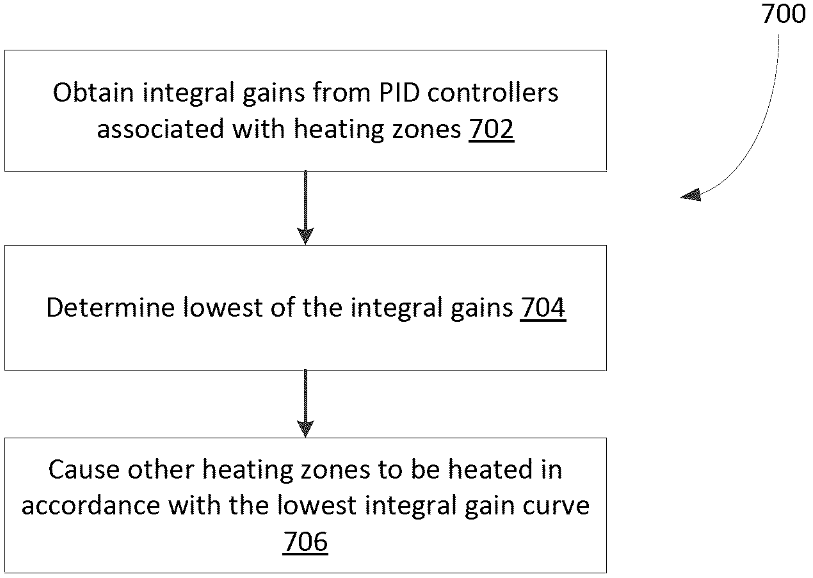
FIG. 7 shows, in flowchart form, another example method for controlling zone heating rates in a multi-zone hot runner.

Reference is now made to FIG. 7, which shows, in flowchart form, an example method 700 for determining zone types of heating zones in a multi-zone hot runner of an injection molding system. The method 700 may be implemented by a controller of an injection molding system, such as the system controller 100 of FIGS. 1 and 2. Operations starting with operation 702 and continuing onward may be performed, for example, by one or more processors (e.g., a microprocessor) of a computing device executing software comprising instructions such as may be stored in a memory of the computing device. The operations of method 700 may be performed in addition to, or as alternatives of, one or more of the operations of methods 300 to 600.

The method 700 describes another technique for harmonizing heat up of the heating zones of an injection molding system. Specifically, a system controller for the injection molding machine may harmonize the integral control terms (or "integral gains") of the PID controllers associated with the heating zones. As mentioned above, a temperature controller for a heating zone may be a PID controller. Each PID controller may initially operate according to its own heat up model, i.e., its own defined control terms of P, I, and D. That is, every heating zone may independently tune initially.

For each heating zone, the system controller obtains the integral control term from PID controller associated with the heating zone, in operation 702. In operation 704, the system controller determines a lowest one of the integral control terms from the PID controllers. This "lowest" integral gain is shared with all of the heating zones so that all zones are forced to heat up along the same heating curve. That is, the system controller may cause other heating zones to be heated in accordance with the lowest integral gain curve, in operation 706.

In some embodiments, the system controller may combine the two above-mentioned techniques for harmonizing heat up among heating zones. Specifically, the system controller may cause the heating zones to follow a lowest integral gain curve when none of the heating zones is in saturation, but force the heating zones to switch to slope-following mode when one of the zones enters saturation state.

In those cases where integral gain is determined to be too slow (e.g., below a defined threshold), the integral gain may be inflated by a predefined factor so that the heat up for the heating zone occurs faster. That is, the integral gain of slower heating zones may be artificially inflated, pushing them deeper into saturation.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An injection molding system, comprising:
- a hot runner including:
  - a plurality of heaters arranged into one or more defined heating zones within the hot runner; and
  - at least one temperature sensor associated with each of the heating zones, and
- a system controller coupled to the plurality of heaters, the system controller being configured to:
  - for each of the heating zones:
    - determine a first control gain value associated with the heating zone;
    - determine a total heater power of the respective heaters associated with the heating zone;
    - calculate a relative weight associated with the heating zone based on the first control gain value and the total heater power; and
    - determine a zone type associated with the heating zone based on the relative weight.

2. The injection molding system of claim 1, wherein the at least one temperature sensor comprises a thermocouple.

3. The injection molding system of claim 1, wherein the zone type associated with the heating zone comprises one of: a manifold heating zone; a nozzle tip heating zone; a sprue bushing heating zone; a barrel heating zone; a probe heating zone; or a shooting pot heating zone.

4. The injection molding system of claim 1, wherein calculating the relative weight associated with the heating zone comprises computing a gain-power product of the first control gain value and the total heater power.

5. The injection molding system of claim 4, wherein the system controller is further configured to determine a sorted list of the heating zones based on ordering the heating zones by their respective gain-power products.

6. The injection molding system of claim 5, wherein the system controller is further configured to parse the sorted list of the heating zones at delineator values thereof.

7. The injection molding system of claim 1, wherein the system controller is further configured to identify a plurality of the heating zones in which at least a part of a manifold of the hot runner is located.

8. The injection molding system of claim 1, further comprising a plurality of temperature controllers, wherein each of the temperature controllers is associated with a respective one of the heating zones and is operably connected to at least one of the heaters.

9. The injection molding system of claim 8, wherein each of the temperature controllers comprises a proportional-integral-derivative (PID) controller.

10. The injection molding system of claim 9, wherein the first control gain value comprises a proportional gain value of the PID controller.

11. A processor-implemented method for operating an injection molding machine having a hot runner, the method comprising:
- for each of a plurality of defined heating zones within the hot runner having at least one temperature sensor associated therewith:
  - determining a first control gain value associated with the heating zone;
  - determining a total heater power of heaters associated with the heating zone;
  - calculating a relative weight associated with the heating zone based on the first control gain value and the total heater power; and
  - determining a zone type associated with the heating zone based on the relative weight.

12. The method of claim 11, wherein the at least one temperature sensor comprises a thermocouple.

13. The method of claim 11, wherein the zone type associated with the heating zone comprises one of: a manifold heating zone; a nozzle tip heating zone; a sprue bushing heating zone; a barrel heating zone; a probe heating zone; or a shooting pot heating zone.

14. The method of claim 11, wherein calculating the relative weight associated with the heating zone comprises computing a gain-power product of the first control gain value and the total heater power.

15. The method of claim 14, further comprising determining a sorted list of the heating zones based on ordering the heating zones by their respective gain-power products.

16. The method of claim 15, further comprising parsing the sorted list of the heating zones at delineator values thereof.

17. The method of claim 11, further comprising identifying a plurality of the heating zones in which at least a part of a manifold of the hot runner is located.

18. The method of claim 11, further comprising operably connecting a plurality of the heaters associated with each of the heating zones to a temperature controller for the heating zone.

19. The method of claim 18, wherein each of the temperature controllers comprises a proportional-integral-derivative (PID) controller.

20. The method of claim 19, wherein the first control gain value comprises a proportional gain value of the PID controller.

* * * * *